(12) United States Patent
Paulsen et al.

(10) Patent No.: US 10,193,134 B2
(45) Date of Patent: Jan. 29, 2019

(54) DOPED SODIUM MANGANESE OXIDE CATHODE MATERIAL FOR SODIUM ION BATTERIES

(71) Applicants: Umicore, Brussels (BE); Umicore Korea Ltd., Chungnam (KR); Tokyo University of Science Foundation, Tokyo (JP)

(72) Inventors: Jens Paulsen, Daejeon (KR); Shinichi Komaba, Tokyo (JP); Ryo Hara, Tokyo (JP); Naoaki Yabuuchi, Tokyo (JP); Masataka Kajiyama, Tokyo (JP)

(73) Assignees: UMICORE, Brussels (BE); UMICORE KOREA LTD., Chungnam (KR); TOKYO UNIVERSITY OF SCIENCE FOUNDATION, Tokyo (JP)

( * ) Notice: Subject to any disclaimer, the term of this patent is extended or adjusted under 35 U.S.C. 154(b) by 431 days.

(21) Appl. No.: 14/770,536

(22) PCT Filed: Feb. 24, 2014

(86) PCT No.: PCT/IB2014/059201
§ 371 (c)(1),
(2) Date: Aug. 26, 2015

(87) PCT Pub. No.: WO2014/132174
PCT Pub. Date: Sep. 4, 2014

(65) Prior Publication Data
US 2016/0013470 A1    Jan. 14, 2016

Related U.S. Application Data

(60) Provisional application No. 61/769,765, filed on Feb. 27, 2013.

(30) Foreign Application Priority Data

Jun. 14, 2013 (EP) ..................... 13171952

(51) Int. Cl.
| | |
|---|---|
| H01M 4/505 | (2010.01) |
| H01M 10/054 | (2010.01) |
| C01G 45/12 | (2006.01) |
| H01M 4/131 | (2010.01) |
| H01M 4/525 | (2010.01) |
| H01M 4/02 | (2006.01) |
| H01M 4/04 | (2006.01) |

(52) U.S. Cl.
CPC ........ *H01M 4/131* (2013.01); *C01G 45/1228* (2013.01); *H01M 4/505* (2013.01); *H01M 4/525* (2013.01); *H01M 10/054* (2013.01); *C01P 2002/50* (2013.01); *C01P 2002/52* (2013.01); *C01P 2002/72* (2013.01); *C01P 2002/76* (2013.01); *C01P 2004/61* (2013.01); *H01M 4/0445* (2013.01); *H01M 2004/021* (2013.01); *H01M 2004/028* (2013.01)

(58) Field of Classification Search
CPC .................................................. H01M 10/054
See application file for complete search history.

(56) References Cited

U.S. PATENT DOCUMENTS

| | | |
|---|---|---|
| 7,695,868 B2 | 4/2010 | Inoue et al. |
| 2010/0248040 A1 | 9/2010 | Saito et al. |
| 2011/0159345 A1 | 6/2011 | Makidera et al. |
| 2011/0200879 A1 | 8/2011 | Saito et al. |
| 2012/0015230 A1 | 1/2012 | Kuze |
| 2012/0183837 A1 | 7/2012 | Johnson et al. |

FOREIGN PATENT DOCUMENTS

| | | |
|---|---|---|
| JP | 2010235434 A | 10/2010 |
| JP | 2012204281 A | 10/2012 |
| JP | 2014157686 (A) | 8/2014 |
| WO | WO2012/060295 | 5/2012 |

OTHER PUBLICATIONS

Braconnier, J-J., et al., Comportement Electrochimique des Phases $Na_xCoO_2$, *Mat. Res. Bull.*, vol. 15 (1980), p. 1797-1804 (English Abstract provided).

Caballero, A., et al. "Synthesis and Characterization of High-Temperature Hexagonal P2-$Na_{0.6}$ $MnO_2$ and its Electrochemical Behaviour as Cathode in Sodium Cells", *J. Mater. Chem.*, vol. 12 (2002), pp. 1142-1147.

Carlier, D., et al. "The P2-$Na_{2/3}CO_{2/3}Mn_{1/3}O_2$ Phase: Structure, Physical Properties and Electrochemical Behavior as Positive Electrode in Sodium Battery", *Dalton Trans.*, vol. 40 (2011), pp. 9306-9312.

Lu, Z., et al. "Layered Cathode Materials $Li[Ni_x Li_{(1/3-2x/3)}Mn_{(2/3-x/3)}]O_2$ for Lithium-Ion Batteries", *Electrochemical and Solid-State Letters*, vol. 4, No. 11 (2001), pp. A191-A194.

(Continued)

*Primary Examiner* — Jonathan Crepeau
(74) *Attorney, Agent, or Firm* — NK Patent Law

(57) ABSTRACT

A sodium transition metal cathode material for a rechargeable sodium battery having a P2 layered bronze crystal structure, comprising at least 55 mol % manganese, wherein the manganese valence state is at least 3.75. The material undergoes a structural transformation to a secondary cathode material by extraction of sodium during the $1^{st}$ charge of a rechargeable sodium battery comprising the sodium cathode material. The material has either a composition $Na_xMO_2$ where M=$Mn_{1-y-z}Li_yA_z$ where z<0.2 and y<0.33 and 0.66<x<0.95, and wherein A consists of either one of more elements of the group Ti, Fe, Ni, Mg and Co, or a composition NaxMO2 where M=$Li_aMn_{1-a-b-c}Mg_bA_c$ where 0<a<0.2, c<0.2 and 0.2<a+b<0.46 and 0.66<x<0.95, and wherein A consists of either one of more elements of the group Ti, Fe, Ni and Co.

18 Claims, 3 Drawing Sheets

(56) References Cited

OTHER PUBLICATIONS

Paulsen, J.M., et al. "Studies of the Layered Manganese Bronzes, $Na_{2/3}[Mn_{1-x}M_x]O_2$ with M=Co, Ni, Li, and $Li_{2/3}[Mn_{1-x}M_x]O_2$ Prepared by Ion Exchange", *Solid State Ionics*, vol. 126 (1999), pp. 3-24.

Paulsen, J.M., et al., "Layered T2-, O6-, O2-, and P2-Type $A_{2/3}[M'^{2+}_{1/3}M^{4+}_{2/3}]O_2$ Bronzes, A=Li, Na; M'=Ni, Mg; M=Mn, Ti", *Chem. Mater.*, vol. 12, No. 8 (2000), pp. 2257-2267.

Yabuuchi, N., et al., "P2-Type $Na_x[Fe_{1/2}Mn_{1/2}]O_2$ made from Earth-Abundant Elements for Rechargeable Na Batteries", *Nature Materials*, vol. 11 (Jun. 2012), p. 512-517.

Yuan, D., et al., "Synthesis and Electrochemical Behaviors of Layered $Na_{0.67}[Mn_{0.65}Co_{0.2}Ni_{0.15}]O_2$ Microflakes as a Stable Cathode Material for Sodium-Ion Batteries", *J. Mater. Chem. A*, vol. 1 (2013), pp. 3895-3899.

International Search Report for PCT/IB2014/059201, dated Jun. 12, 2014.

Kim, D., et al., "Enabling Sodium Batteries Using Lithium-Substituted Sodium Layered Transition Metal Oxide Cathodes", *Adv. Energy Mater.* (2011), vol. 1, pp. 333-336.

Buchholz, D., et al. "P2-Type Layered $Na_{0.45}Ni_{0.22}Co_{0.11}Mn_{0.66}O_2$ as Intercalation Host Material for Lithium and Sodium Batteries", *Electrochimica Acta*, (Mar. 4, 2013).

Buchholz, D., et al., "Toward Na-ion Batteries-Synthesis and Characterization of a Novel High Capacity Na Ion Intercalation Material", *Chemistry of Materials*, vol. 25, No. 2 (Mar. 4, 2013), pp. 142-148.

Lu, Z., et al., "In Situ X-ray Diffraction Study of $P2-Na_{2/3}[Ni_{1/3}Mn_{2/3}]O_2$", *Journal of the Electrochemical Society*, vol. 148, No. 11 (Sep. 20, 2001), p. A1225.

Partial European Search Report for EP 13 17 1952, dated Sep. 11, 2013.

ns with manganese based Na containing cathode materials exist: patent applications US 2010/0248040 A1 and US 2011/0200879 A1 by Sanyo teach to

DOPED SODIUM MANGANESE OXIDE CATHODE MATERIAL FOR SODIUM ION BATTERIES

This application is a National Stage application of International Application No. PCT/IB2014/059201, filed Feb. 24, 2014, which claims the benefit of U.S. Provisional Application Ser. No. 61/769,765, filed Feb. 27, 2013. This application also claims priority under 35 U.S.C. § 119 to European Application No. 13171952.8, filed Jun. 14, 2013.

TECHNICAL FIELD AND BACKGROUND

The invention is related to sodium transition metal cathode materials for a rechargeable sodium battery. The transition metal is composed of manganese and a minority of various other metals.

There are worldwide efforts to limit consumption of fossil fuels by introducing "green cars" like electric vehicles. Currently the trend is to use Li rechargeable batteries for these cars. However, this approach is disputed because it might be environmentally difficult to produce sufficient lithium precursors in a sustainable way.

Lithium is abundant; the content of Li only in seawater is estimated to be 230 billion tons. However, lithium is generally occurring in low concentrations which limits the practically available recourses to about 13 million tons according, to a recent survey. These resources are insufficient for a world full of "green cars". Besides efforts to expand the availability of lithium, for example by extraction from seawater, Li free rechargeable batteries, such as sodium rechargeable batteries, receive renewed interest.

Besides Li scarcity other potential issues are not fully solved: $LiCoO_2$, NMC ($LiMO_2$ where $M=Li_aM'_{1-a}$, $M'=Ni_{1-x-y}Mn_xCo_y$, and LNCO ($LiMO_2$ with $M=Ni_{1-x-y}Co_xAl_y$) based cathode materials have the highest energy density, but they contain scarce cobalt and relatively expensive nickel. Cobalt and Nickel free cathodes like spinel ($LiMn_2O_4$) or olivine ($LiFePO_4$) have the disadvantage of a lower gravimetric energy density. Other potentially cheap and high energy cathode materials are far from commercialization because major issues (like cycle stability, gas generation, compatibility with current electrolytes) are not solved yet.

Examples of these are:
1) Li and Mn based cathode materials (within this patent application we refer to them as "HLM") being a solid state solution of $LiMO_2$ with $Li_2MnO_3$ and
2) high voltage spinel materials ($LiNi_{1/2}Mn_{3/2}O_4$)

Li batteries for green cars have very tough criteria to achieve a sufficient calendar life (or cycle stability) and safety. Consumers expect that the battery still works well after 10 years of use; consumers also expect a high safety. Large Li batteries always have the potential to catch fire or—in the worst cases—to explode. Cycle stability and safety have been improved, but further improvements are required.

In many aspects sodium behaves electrochemical similar to lithium. The theoretical possibility of sodium ion batteries is known since the late 70-ties. The successful reversible intercalation and de-intercalation of sodium ions in a cathode material ($Na_xCoO_2$) has been described already 1981 by Delmas, who showed data of half cells (Na-cathode and sodium metal anode). However, similar to Lithium batteries, sodium metal cannot be used as anode material in commercial batteries due to dendrite formation, so an anode material adapted to sodium ion batteries is required. In 1999 a group at Dalhousie University demonstrated hard carbon as Na intercalation anode material. Since that time the feasibility of Na batteries is in principle accepted, however, in the shade of the ever-increasing Li rechargeable battery world only relatively few efforts were assigned to develop practical sodium intercalation batteries.

Sodium ion batteries are thus in their early stages of technological development. It is already clear now that layered sodium ion cathodes can be cheap because they need less cobalt or can even be cobalt free. The possibility to avoid cobalt is related to basic crystal-physical properties. Sodium bronzes are perfectly layered without cobalt, whereas in $LiMO_2$Co is important to stabilize the layered crystal structure, and to prevent cation rearrangement (migration of transition metal to lithium sites) during cycling.

In "P2-type $Na_x[Fe_{1/2}Mn_{1/2}]O_2$ made from earth-abundant elements for rechargeable Na batteries" by Yabuuchi et al. (in *Nature Materials* 11 (2012), 512-517), a cathode material $Na_xFe_{1/2}Mn_{1/2}O_2$ has been disclosed. This cathode material does not contain scarce or toxic elements, and it shows high reversible capacity in Na ion batteries. The cathode material is a true intercalation material. The Fe—Mn-oxide host structure remains intact during sodium de-intercalation and re-insertion. Sodium ion batteries containing high capacity sodium cathodes like $Na_xFe_{1/2}Mn_{1/2}O_2$ and anodes like hard carbon increasingly will be able to challenge the dominance of Li ion batteries, especially for green cars. However, Na—Fe—Mn-oxide cathodes are not sufficiently air stable and are difficult to prepare. Another class of known sodium intercalation cathode materials are phosphates like $NaMn_{0.5}Fe_{0.5}PO_4$, or fluorite-phosphates like $NaVPO_4F$ or $Na_2FePO_4F$. However, currently no commercial cathode materials for sodium ion batteries exist. All currently proposed materials show problems. For example vanadium oxide based cathodes are toxic, and phosphates or fluorophosphates have a low gravimetric capacity. Na—Co-oxide cathode materials are expensive since they contain scarce cobalt.

Some prior work about manganese based Na containing cathode materials exists: patent applications US 2010/0248040 A1 and US 2011/0200879 A1 by Sanyo teach to apply cathodes which contain sodium as well as lithium for Li ion batteries (not sodium ion) batteries. US 2010/0248040 A1 describes $Na_aLi_bM_xO_2$ where M is selected from Mn, Fe, Co, Ni and where the diffraction pattern has a peak at 15.9-16.9 degree. The cathodes do not contain magnesium, and the cathodes are used in Li ion batteries. A special charge plateau due to high Mn valence state is not observed.

In "Studies of the layered manganese bronzes, $Na_{2/3}[Mn_{1-x}M_x]O_2$ with M=Co, Ni, Li, and $Li_{2/3}[Mn_{1-x}M_x]O_2$ prepared by ion-exchange" by Paulsen and Dahn (in *Solid State Ionics* 126 (1999) p. 3-24), and in "Layered T2-, O6-, O2-, and P2-Type $A_{2/3}[M'^{2+}_{1/3}M^{4+}_{2/3}]O_2$ Bronzes, A=Li, Na; M"=Ni, Mg; M=Mn, Ti" by Paulsen et al. (in *Chem. Mater.* 2000, 12, 2257-2267) the sodium bronzes are not used as sodium cathode materials but are precursors for preparing Li-transition metal oxides by ion-exchange.

It remains an open question if sodium rechargeable battery technology will or will not allow to achieve a higher calendar live (cycle stability) ion cathode, a better safety, and this at a reduced cost or with an improved performance, by allowing a different design when compared to lithium ion battery technology. It is however clear that rechargeable sodium battery technology has the potential to replace lithium technology if cheap sodium cathode materials with high capacity allow to achieve good calendar life and high safety at low cost. The latter problem is solved by the present invention.

SUMMARY

Viewed from a first aspect, the invention can provide a sodium transition metal cathode material for a rechargeable sodium battery, having a P2 layered bronze crystal structure and having a composition $Na_xMO_2 (0<x<1)$, M comprising at least 55 mol % manganese, wherein the manganese valence state is at least 3.75. In one embodiment $x>\frac{2}{3}$. In another embodiment M comprises cobalt with a molar ratio of Co:M of <0.1:1. The sodium cathode material of the invention may have a peak in the XRD diffraction pattern in the region 19-21 degree.

In an embodiment, the sodium cathode material of the invention has a $1^{st}$ charge voltage profile in a rechargeable sodium battery that increases to at least 3.5V at less than 25% state of charge, when charged to at least 4.4V at a rate≤C/10. In another embodiment, the $1^{st}$ charge voltage profile in a rechargeable sodium battery increases to at least 4V at less than 40% state of charge, when charged to at least 4.4V at a rate≤C/10. In still another embodiment, the $1^{st}$ charge voltage profile in a rechargeable sodium battery increases to at least 4V at less than 25% state of charge, when charged to at least 4.4V at a rate≤C/10.

In an embodiment, the sodium cathode material $Na_xMO_2$ is characterized by: $\frac{2}{3}<x<0.95$, $M=Mn_{1-y-z} Li_y A_z$, A consisting of either one of more elements of the group consisting of Ti, Fe, Ni, Mg, Cr and Co, with 0≤z<0.2 and 0<y<0.33. In one embodiment 0.70<x<0.95. In another embodiment z>0 and A comprises cobalt with a molar ratio of Co:M of <0.1:1. In still another embodiment z>0 and A is either one or both of Ni and Mg. In another embodiment wherein z>0, $A_z=A1_{z-a-b}A2_aA3_b$, with 0≤a+b≤z, and:
  A1 is selected from the group of divalent cations consisting of Mg and Ni,
  A2 is selected from the group of trivalent cations consisting of Fe and Cr,
  A3 being the tetravalent cation Ti,
and y+z<0.46 and 3.75<(4−{x+y+2(z-a-b)+3a+4b})/(1−y−z)≤4.05.

In an embodiment, the sodium cathode material $Na_xMO_2$ is characterized by: $\frac{2}{3}<x<0.95$, $M=Li_a Mn_{1-a'-b'-c'}Mg_{b'}A'_{c'}$ with 0≤a'<0.2, b'>0, c'<0.2 and 0.2<a'+b'<0.46, and A' consists of either one of more elements of the group consisting of Ti, Cr, Fe, Ni and Co. In one embodiment 0.70≤x≤0.85, 0.23≤b'≤0.28 and c'=0. In other embodiments, c'>0. In such embodiments, A' may comprise cobalt with a molar ratio of Co:M of <0.1:1.

The sodium cathode material according to the first aspect of the invention may have a reversible capacity of more than 170 mAh/g when cycled in a half cell versus sodium metal in the voltage range 1.5-4.4V in a rechargeable sodium battery. In one embodiment, the sodium cathode material has a specific surface area (BET) between 0.2 and 5 m²/g, preferably between 0.5 and 1.5 m²/g, and a particle size distribution with 1<D50<30 μm, preferably 3<D50<15 μm.

In a further embodiment, the sodium cathode material $Na_xMO_2$ is characterized by a composition $Na_x[Mg_{y''}Mn_{1-y''}]O_2$ ($M=Mg_{y''}Mn_{1-y''}$), with 0.67<x<0.95 and [(x−0.25)/1.75]≤y"≤[(x+0.05)/2.05].

In the claims, the invention discloses a cathode material for rechargeable sodium batteries that is different from true intercalation materials like $Na_xFe_{1/2}Mn_{1/2}O_2$. The new cathode materials for rechargeable sodium batteries have the following features:
1) they are based on oxides with layered crystal structure of the "bronze variety",
2) having a P2 type crystal structure,
3) consisting of cheap and abundant sodium and manganese and containing a low-valent dopant chosen from Mg, Li, Ni and Fe,
4) preferably containing either Mg, Li or both Mg and Li in a general formula $Na_x[Mg_yM_{1-y}]O_2$, and finally
5) containing no or only minor amounts of cobalt; within M Co may be less than 10 mol %, or even 0.

A preferred composition is $Na_x[Mg_yM_{1-y}]O_2$ where M contains dominantly tetravalent manganese. The valence state of the manganese is near to 4, more specially the Mn valence state is between 3.75 and 4.05. The materials are not true intercalation materials, since their structure changes significantly during the extraction of sodium during the first charge, and after this "activation" a secondary, possibly oxygen deficient structure is obtained, which reversible intercalates and de-intercalates sodium.

Viewed from a second aspect, the invention can provide a secondary intercalation cathode material which reversibly intercalates and de-intercalates sodium, obtained by a structural transformation by extraction of sodium from the sodium cathode material of the invention during the $1^{st}$ charge in a rechargeable sodium battery charged to at least 4.4V. In one embodiment the secondary intercalation cathode material is oxygen deficient, since during the $1^{st}$ charge both sodium and oxygen may be extracted. In another embodiment, the secondary intercalation cathode material has a $2^{nd}$ charge voltage profile that increases to less than 4V at 40% state of charge, when charged to at least 4.4V at a rate≤C/10. In still another embodiment, the $2^{nd}$ charge voltage profile increases to less than 4V at 50% state of charge, when charged to at least 4.4V at a rate≤C/10. In still another embodiment, the $2^{nd}$ charge voltage profile increases to less than 3.5V at 50% state of charge, when charged to at least 4.4V at a rate≤C/10.

Viewed from a third aspect, the invention can provide the use of the sodium cathode material of the first aspect of the invention in a rechargeable sodium battery.

Viewed from a fourth aspect, the invention can provide a rechargeable sodium battery comprising an anode and a cathode, wherein the cathode comprises the sodium cathode material of the first aspect of the invention. In an embodiment, the sodium cathode material has a composition $Na_xMO_2$ with 0.66<x<0.95, wherein $M=Mn_{1-y-z} Li_y A_z$, A consisting of either one of more elements of the group consisting of Ti, Fe, Ni, Mg, Cr and Co, with 0≤z<0.2 and 0<y<0.33. In a further embodiment z>0 and A comprises cobalt with a molar ratio of Co:M of <0.1:1. In another embodiment z>0 and A is either one or both of Ni and Mg. In still another embodiment z>0 and $A_z=A1_{z-a-b}A2_aA3_b$, with 0≤a+b≤z, and:
  A1 is selected from the group of divalent cations consisting of Mg and Ni,
  A2 is selected from the group of trivalent cations consisting of Fe and Cr,
  A3 being the tetravalent cation Ti,
and y+z<0.46 and 3.75<(4−{x+y+2(z-a-b)+3a+4b})/(1−y−z)≤4.05.

In an embodiment, the battery comprises sodium cathode material $Na_xMO_2$ characterized by 0.66<x<0.95, $M=Li_{a'}Mn_{1-a'-b'-c'} Mg_{b'}A'_{c'}$, A' consisting of either one of more elements of the group consisting of Ti, Cr, Fe, Ni and Co, with $0 \leq a' < 0.2$, $b' > 0$, $c' < 0.2$ and $0.2 < a' + b' < 0.46$. In one embodiment $c' > 0$. In another embodiment A' comprises cobalt with a molar ratio of Co:M of <0.1:1.

In an embodiment, the battery comprises sodium cathode material $Na_xMO_2$ characterized by $M=Mg_{y''}=Mn_{1-y'''}$, $0.60 < x < 0.95$ and $[(x-0.25)/1.75] \leq y'' \leq [(x+0.05)/2.05]$.

In all of these embodiments, the rechargeable sodium battery may comprise an anode comprising a current collector comprising an Al foil. The current collector may also consist solely of an Al foil.

It should be mentioned that US 2011/0200879 describes cathodes with a typical formula $Li_xNa_yCo_aMn_bM_zO_2$ and they always contain lithium (on the sodium crystallographic sites), where the lithium originates from an ion exchange process. Manganese content b is limited to less than 0.38 mol. This is different from the current invention which typically contain >0.5 mol Mn and does not involve ion exchange. Also U.S. Pat. No. 7,695,868 B2 by Sanyo describes a cathode for sodium ion batteries. The cathodes contain Li and additionally at least 2 transition metals: besides Mn (with a content less than 0.55 mol) at least one selected from Co, Ni, Fe. The voltage profile is different from the cathodes of the current invention. Typically the first and second charge are similar. A pronounced first charge plateau—typical for high Mn valence state—is not observed, and the high voltage of 4V during first charge is not reached at low state of charge as described in the current invention.

DETAILED DESCRIPTION

Figure 1:
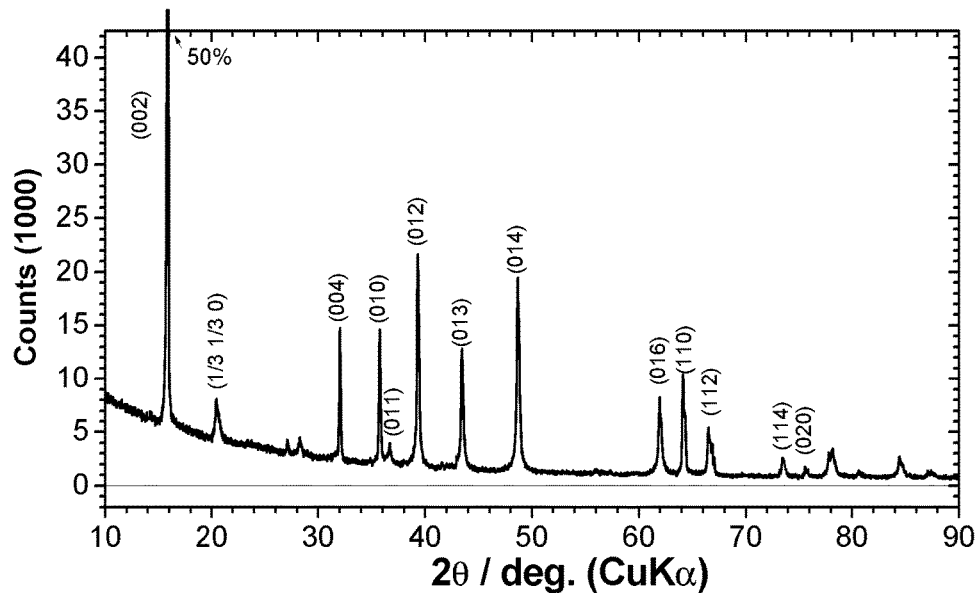
FIG. 1: XRD powder diffraction pattern of as prepared $Na_xMg_{1/3}Mn_{2/3}O_2$ cathode material

The current invention discloses an alternative approach to sodium ion batteries. The cathode has a low raw material cost, shows high capacity and is sufficiently stable in air. The cathode materials also have the potential to cycle in a stable manner.

The invention implements the following aspects:
1) the cathode material belongs to the sodium bronze materials and has the layered P2 structure.
2) x in $Na_xMO_2$ is about or preferably larger than ⅔. Na is located in sodium layers of the crystal structure and M is the metal located in the non-sodium metal layers of the crystal structure. In this case usually the P2 crystal structure is stable, a higher x value potentially increases the reversible capacity in full cells.
3) the M layers contain dominantly manganese that is near to the tetravalent valence state. The tetravalent manganese is responsible for high air stability and a high reversible capacity.
4) the M in the cathode contains further cations with low valence state (+1, +2). A typical cation is Mg(2+) but also Li(1+) and Ni(2+) fit well in the crystal structure. The low valence state doping is essential to achieve a manganese near to the tetravalent valence state.
5) the first cycle charge profile differs significantly from later cycle charge profiles. This property is related to the high-near tetravalent valence state of manganese. Possibly during the first charge sodium is extracted together with oxygen from the crystal structure, which might react with electrolyte. A possibly similar effect is today known for lithium cathode materials of HLM type, described first by a group at Dalhousie University Canada (such as in "Layered Cathode Materials LiNiLiMnO₂ for Lithium-Ion Batteries", Zhonghua Lu, D. D. MacNeil and J. R. Dahn, *Electrochemical and Solid-State Letters*, 4 (11) A191-A194 (2001)), but not described for sodium cells.
6) one typical composition is $Na_xMO_2$ where x is about or larger than 0.67 and M consists of magnesium doped manganese with M being about $Mg_{0.25}Mn_{0.75}$. This embodiment composition achieves 1)-5).

As indicated before, the cathode materials of the current invention belong to the so-called "bronze phases". Different sodium transition metal oxide crystal phases exist depending on exact sodium to metal stoichiometry and preparation conditions. Of interest for cathodes are phases $Na_xMO_2$ with high "x". This is because in a sodium ion cell the cathode supplies the sodium which cycles in the battery. Particularly of interest are layered phases. Within the layered bronze phases (P2, P3, O3, . . . ) the P2 phases show the best performance.

The O3, P2, P3 nomenclature is a simple way to classify layered bronze phases. The letter stands for the sodium environment (P for prismatic, O for octahedral) and the number stands for the number of metal layers within the prismatic unit cell. Another way to describe the P2 phase is to refer to the oxygen positions within a hexagonal stacking. The oxygen stacking is AB BA AB with metal M located on c and sodium partially located on prismatic sites x=(a,b) and y=(b,c), resulting in a stacking sequence (AcB x BcA y AcB . . . ). A detailed description of stacking sequences in sodium transition metal oxide bronzes is given in "Comportement electrochimique des phases $Na_xCoO_2$" *Materials Research Bulletin*, Volume 15, Issue 12, December 1980, Pages 1797-1804.

It is relatively easy to prepare the P2 phases $Na_xMO_2$ with x near to 0.67. However, a higher Na:M ratio is desired to increase the amount of sodium which can cycle in the battery. Increasing x seems possible by optimizing the firing conditions. In one embodiment the sodium cathode material is single phase and has the P2 structure. For certain applications it might be desirable or tolerable to use phase mixtures. The M in the cathode materials $Na_xMO_2$ of the present invention is dominantly manganese. The average manganese valence state is near to 4. To achieve this valence state manganese is doped with a low valent cation like magnesium, Mg(2+) and optionally lithium, Li(1+). Other low valent cations which fit well to the crystal structure and increase the manganese valence state are Ni(2+).

Magnesium generally can replace 3+ and create 4+ valent manganese on octahedral sites. Assuming x=⅔ in $Na_x[Mg_yMn_{1-y}]O_2$ the required Mg stoichiometry y=⅓. Thus an idealized composition of the current invention is $Na_{2/3}[Mg_{1/3}Mn_{2/3}]O_2$ where all Mn is tetravalent. Higher x is desired to increase the amount of sodium which can be extracted to be available for reversible cycling. If x is higher in $Na_xMO_2$ then also the Mg or Li stoichiometry will be increased if manganese keeps the tetravalent state. So another idealized composition is $Na_{3/4}[Mg_{0.375}Mn_{0.625}]O_2$.

Currently the upper limit for x is not known. If it would be 1 then the idealized composition is $Na_1[Mg_{1/2}Mn_{1/2}]O_2$.

The authors believe that values above x=0.9 are more difficult to achieve within the P2 crystal structure. They also observed that simultaneous doping of Mg and Li can be efficient to achieve larger Na stoichiometry. A possible ideal composition for Mg+Li doping is $Na_{3/4}[Li_{0.0667}Mg_{0.275}Mn_{0.6584}]O_2$. In one embodiment, the cathode materials $Na_xMO_2$ of the present invention are located near to the ideal stoichiometric line connecting $Na_{2/3}[Mg_{1/3}Mn_{2/3}]O_2$ and $Na_1[Mg_{1/2}Mn_{1/2}]O_2$, with 0.6<x<0.9. Given the variation in valence state for Mn (from 3.75 to 4.05), the general formula for this material is $Na_x[Mg_y Mn_{1-y}]O_2$, with 0.60<x<0.95 and $[(x-0.25)/1.75] \leq y \leq [(x+0.05)/2.05]$.

High Mg doping levels (like 0.5 $Na_1[Mg_{1/2}Mn_{1/2}]O_2$) have disadvantages. First it can be difficult to obtain single phase crystalline phases. Secondly the amount of manganese, the redox-active cation, decreases, thus reducing the reversible capacity. In this case an additional Li doping allows to achieve high valent state manganese with less reduction of manganese content. In the following this approach will be demonstrated using the Mg free compositions $Na[Li_{1/3}Mn_{2/3}]O_2$, $Na_{3/4}[Li_{1/4}Mn_{0.75}]O_2$ and $Na_{2/3}[Li_{2/9}Mn_{7/9}]O_2$.

Examples for the combination of Li and Mg doping resulting in tetravalent manganese are solid solutions of $Na_{2/3}[Mg_{1/3}Mn_{2/3}]O_2$ with $Na_{2/3}[Li_{2/9}Mn_{7/9}]O_2$, for ex. resulting in $Na_{2/3}[Li_{1/9}Mg_{1/6}Mn_{0.722}]O_2$; $Na_{3/4}[Li_{0.0667}Mg_{0.275}Mn_{0.6584}]O_2$ with $Na_{3/4}[Li_{1/4}Mn_{0.75}]O_2$ for ex. resulting in $Na_{3/4}[Li_{0.1583}Mg_{0.1375}Mn_{0.7042}]O_2$; and $Na_1[Mg_{1/2}Mn_{1/2}]O_2$ with $Na[Li_{1/3}Mn_{2/3}]O_2$ resulting in $Na_1[Li_{1/6}Mg_{1/4}Mn_{0.59}]O_2$.

The Li:Mn and Mg:Mn value might deviate slightly from the ideal ratio due to phenomena as cation mixing, Li or Na loss during preparation, existence of minor impurity phases, grain boundary effects, existence of some $Mn^{3+}$ etc. Deviations from the ideal ratio of ±15% may be expected. Example: If the ideal Mg:Mn ratio is 1:2 then the real ratio can be 0.85 . . . 1.15:2. Similar deviations are expected if Mg and Li are co-doped. In principle sodium bronzes allow for a variety of dopants. The inventors believe that additional doping of Mn by Li, Ni, Fe, Co etc. can cause further deviations. Since in all cases 4 valent manganese is replaced by a lower valence cation (Co, Fe=3, Ni=2, Li=1) less Mg or less Li—as the case may be—is required, reducing the theoretical amount of Li or Mg needed to achieve tetravalent manganese. So in the case of additional doping both the ideal and real Li:Mn and Mg:Mn ratio is lower than the one calculated above.

Cathode material of the present invention may be prepared by many different methods. In one embodiment the method is a simple solid state reaction using a manganese precursor (like MnOOH, $Mn_2O_3$, $MnO_2$, $MnCO_3$ etc), a sodium precursor (typically $Na_2CO_3$) and a lithium precursor (typically $Li_2CO_3$). Stoichiometric amounts of the Mn, Na and Li precursor are mixed and then fired in an oxygen containing atmosphere like air. A typical sintering temperature is high enough to allow for a complete reaction and the formation of crystallites, but not too high to avoid excessive sintering. A preferred temperature range is between 600° C. and 1000° C. In one embodiment the temperature range is 700° C.-900° C. In $Na_{2/3}[Li_{2/9}Mn_{7/9}]O_2$ lithium and sodium diffuse fast during sintering. However transition metal cations diffuse more slowly. Mg diffuses faster than transition metals but slower than lithium. Therefore, in the case of Mg doping and especially in the case of doping by M=Ni, Co, Fe, it might be indicated to use precursors where the transition metals Mn+M are already well mixed at atomar scale. Such mixed precursors are in many cases obtained by precipitation.

A good morphology of the final product may be obtained if the manganese precursor has a selected microstructure. In this case sintering temperature must be high enough to obtain sufficient crystallinity and low enough to keep the selected morphology. A selected morphology is for example spherical particles containing a certain micro-porosity. The pores will allow for fast Na transport within the electrolyte, filling the pores when the cathode is applied in a sodium battery. Such a morphology has surface area values from 0.3 to 2 $m^2/g$ and a D50 of the particle size distribution between 3 and 30 μm. Precursors with such micro-structure can for example be obtained by controlled precipitation reactions. An example is the precipitation of $MnCO_3$ with a controlled flow of $MnSO_4$ and $Na_2CO_3$ or the precipitation of $Mn(OH)_2$ by a flow of $MnSO_4$ with flows of $NH_4OH$ and NaOH during steady state in a stirred reactor.

The sodium cathode materials are applied to an electrode. A typical electrode or current collector is an aluminum foil covered by a film containing cathode material, binder and conductive additive. Typical binders are polymers such as PVDF and typical conductive additives are carbon fibers or flakes. A basic design limitation for Li rechargeable batteries is the choice of the negative current collector. Aluminum foil is used at the cathode side, but cannot be used for the carbon anode because at low potential Li intercalates into aluminum. So a typical anode current collector is copper foil. As sodium does not alloy with aluminum it allows to use aluminum foils for the anode as well. This can help to save cost (Al is cheaper and more abundant than copper) and in the ultimate case allows for a different design (for example bipolar stacking of cells).

The cathode electrode is thus assembled with an anode electrode (the active material is typically hard carbon) into a cell and electrolyte is added. Typical electrolytes are Na salts (as $NaPF_6$ or $NaClO_4$) dissolved in an organic solvent (e.g. polypropylene). A variety of electrolyte additives can be added to improve cycle stability, safety, high temperature performance etc. A typical additive is fluorinated ethylene carbonate (FEC). The battery itself can have many different designs and shapes. Examples are cylindrical cells, stacked pouch cells, winded prismatic cells etc. As sodium does not intercalate into aluminum bipolar stacks of sodium cells with aluminum current collectors are another possible design.

The $Na_x[Mg_yM_{1-y}]O_2$ material of the invention has the following embodiments, that can also be combined:
- a positive electrode material for a rechargeable battery expressed by the formula $Na_xMO_2$, wherein M=$Mn_{1-y-z}Mg_yA_z$, A being either one or more elements from the group consisting of Li, Ti, Fe, Ni and Co, and wherein 0.60<x<0.95, 0.20≤y≤0.45 and 0≤z<0.2.
- a positive electrode material having a P2 layered bronze crystal structure.
- a positive electrode material wherein Mn has a valence above 3.70, and preferably between 3.75 and 4.05.
- a positive electrode material, wherein the material has a BET surface area between 0.2 and 5 $m^2/g$ and a D50 between 1 and 30 μm.
- a positive electrode material, wherein 0.64≤x≤0.9, preferably 0.64≤x≤0.85; and 0.20≤y≤0.33.
- a positive electrode material, wherein 0.70≤x≤0.85, 0.23≤y≤0.28 and z=0.
- a positive electrode material, wherein x=0.66, y=0.25 and z=0.

a positive electrode material having the general formula $Na_x[Mg_yMn_{1-y}]O_2$, with $0.60<x<0.95$ and $[(x-0.25)/1.75] \leq y \leq [(x+0.05)/2.05]$.

A rechargeable battery comprising this positive electrode material can have the following embodiments:

having a reversible capacity of at least 170 mAh/g when cycled between 1.5 and 4.4 V in a half cell versus Na.

during the first charge-discharge cycle in a battery with sodium metal anode, the irreversible capacity is higher than −9%.

For preparing the material method embodiments may be as follows:

a method for preparing a positive electrode material for a rechargeable battery expressed by the formula $Na_xMO_2$, wherein $M=Mn_{1-y-z}Mg_yA_z$, A being either one or more elements from the group consisting of Li, Ti, Fe, Ni and Co, and wherein $0.60<x<0.95$, $0.2 \leq y \leq 0.45$ and $0 \leq z<0.2$; comprising the steps of:
providing a manganese precursor comprising the element A, such as an A-doped MnOOH, $Mn_2O_3$, $MnO_2$, or $MnCO_3$, a sodium precursor, such as $Na_2CO_3$, and a magnesium precursor, such as MgO, mixing stoichiometric amounts of the precursors, and firing the mixture in an oxygen comprising atmosphere, at a temperature between 600 and 1000° C., preferably between 800 and 900° C.

a method, wherein the manganese precursor doped with the element A is obtained by the precipitation of a mixture comprising $MnSO_4$, a source of A and either NaOH or $Na_2CO_3$.

a method, wherein the manganese precursor comprising the element A is a mixture comprising an undoped Mn precursor, such as MnOOH, $Mn_2O_3$, $MnO_2$, or $MnCO_3$; and a lithium precursor, such as $Li_2CO_3$.

a method, wherein the manganese precursor consists of spherical particles with a D50 between 3 and 30 μm.

The invention will now be illustrated in the following examples:

Example 1: Preparation and Electrochemical Testing

A P2 type Na—Mg—Mn oxide was prepared from $Na_2CO_3$, $Mn_2O_3$ and basic magnesium carbonate $(MgCO_3)_4Mg(OH)_2*5H_2O$. After mixing reagents the mixture was heated at 900° C. in air followed by quenching to yield $Na_{0.7}[Mg_{1/3}Mn_{2/3}]O_2$.

The obtained powder was investigated by XRD powder diffraction (CuKα radiation, wavelength 0.15418 nm). FIG. 1 shows the obtained pattern together with the indexing of diffraction peaks using the hexagonal P2 structure. Basically single phase, high crystalline P2 structure $Na_xMg_{1/3}Mn_{2/3}O_2$ is achieved.

Figure 2:
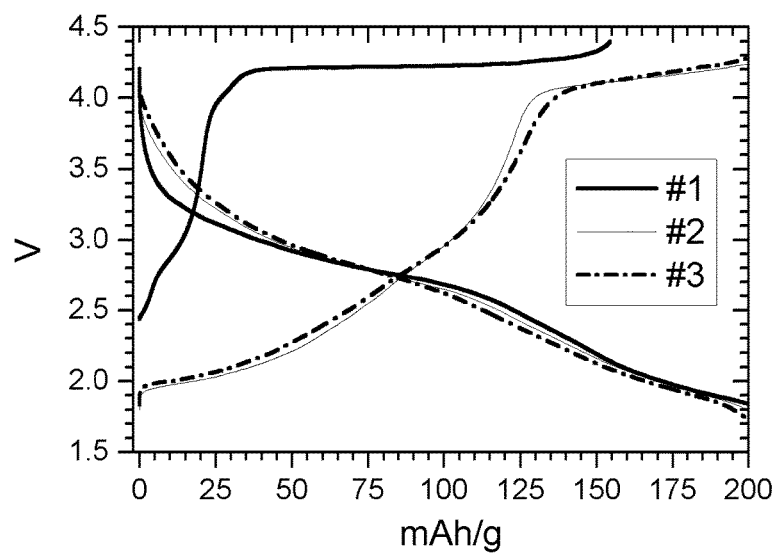
FIG. 2: Results of electrochemical testing of Na—Mg—Mn cathode

The obtained powder was tested in a coin cell with sodium metal anode. Electrode active loading was 3.2 mg/cm². Electrode composition was 8:1:1 (active material:binder (PVDF):carbon). The electrolyte is 1 M $NaClO_4$ in PC (propylene carbonate): DMC (dimethyl carbonate): FEC=49:49:2. The charge discharge voltage range is 1.5-4.4V. The current density is 10 mA/g. FIG. 2 shows the obtained results ($1^{st}$, $2^{nd}$ and $3^{rd}$ charge from left to right from 1.5 to 4.4 V, discharge from 4.4 to 1.5 V). The 1st charge voltage profile shows the typical behaviour for the cathode materials of the invention. Because of the high manganese valence state (near to 4.0) the charge voltage reaches a value of 3.5V fast: already much before 40% state of charge, and then remains relatively flat. During discharge a capacity exceeding 200 mAh/g is obtained. Stable cycling is demonstrated for 3 cycles. The second charge, also typical for cathode materials of the current invention, shows a very different profile. Now 3.5V is reached at much later than 40% state of charge.

Example 2: Preparation of Single Phase P2 $Na_x[Li_yMn_{1-y}]O_2$ with High x The intention of this Example is to demonstrate the possibility to increase the Na:M (M=Li+Mn) ratio beyond 0.67 but keep a high tetravalent manganese content. Similar results are expected independently if Mg, or Li or other low-valent dopants are used. Since Li doping is simple, and good results can be achieved without use of mixed precipitated precursors, but by using a simple solid state reaction, results for $Na_x[Li_yMn_{1-y}]O_2$ are shown.

A large series of samples with varying Na:M and Li:Mn ratios is prepared. Powders are mixed at stoichiometric ratio in a coffee grinder for 1 minute, and pelletized with each pellet mass around 1.7 g. Samples are heated under air ambient air 750° C. for 12 hours, the product is then cooled down to room temperature, and grinded again in a coffee grinder. Table 1.1 lists the samples, target composition and precursors. The table shows samples as divided into 4 sub-groups A-E. The subgroups A-D have different Na:M ratio but within each subgroup samples have fixed Na:M ratio. In subgroup E the Li:Mn is fixed and the Na:M is varied. Group E fixes the Li:Mn at a relatively low value (chosen as result of the analysis of groups A-D) which promises to achieve a single P2 phase with a relatively high Na:M value x. In each subgroup A-E the theoretical Mn valence (assuming that a single P2 phase $Na_x[Li_yMn_{1-y}]O_2$ is achieved) varies from below to above 4.

TABLE 1.1

Preparation of Sodium lithium manganese phases

| | Sample ID | target compound | expected product mass | $Na_2CO_3$ mass | $MnCO_3$ mass | $Li_2CO_3$ mass |
|---|---|---|---|---|---|---|
| Group A | NLM0001 | $Na[Li_{0.35}Mn_{0.65}]O_2$ | 5 | 2.86 | 4.22 | 0.69 |
| | NLM0002 | $Na[Li_{0.33}Mn_{0.67}]O_2$ | 5 | 2.83 | 4.31 | 0.65 |
| | NLM0003 | $Na[Li_{0.30}Mn_{0.7}]O_2$ | 5 | 2.79 | 4.43 | 0.58 |
| Group B | NLM0004 | $Na_{0.9}[Li_{0.33}Mn_{0.67}]O_2$ | 5 | 2.61 | 4.42 | 0.66 |
| | NLM0005 | $Na_{0.9}[Li_{0.3}Mn_{0.7}]O_2$ | 5 | 2.57 | 4.54 | 0.59 |
| | NLM0006 | $Na_{0.9}[Li_{0.25}Mn_{0.75}]O_2$ | 5 | 2.50 | 4.74 | 0.48 |
| Group C | NLM0007 | $Na_{0.8}[Li_{0.275}Mn_{0.725}]O_2$ | 5 | 2.31 | 4.76 | 0.55 |
| | NLM0008 | $Na_{0.8}[Li_{0.25}Mn_{0.75}]O_2$ | 5 | 2.28 | 4.86 | 0.49 |
| | NLM0009 | $Na_{0.8}[Li_{0.2}Mn_{0.8}]O_2$ | 5 | 2.22 | 5.06 | 0.39 |

TABLE 1.1-continued

Preparation of Sodium lithium manganese phases

| | Sample ID | target compound | expected product mass | $Na_2CO_3$ mass | $MnCO_3$ mass | $Li_2CO_3$ mass |
|---|---|---|---|---|---|---|
| Group D | NLM0010 | $Na_{0.7}[Li_{0.25}Mn_{0.75}]O_2$ | 5 | 2.05 | 4.98 | 0.51 |
| | NLM0011 | $Na_{0.7}[Li_{0.225}Mn_{0.775}]O_2$ | 5 | 2.02 | 5.08 | 0.45 |
| | NLM0012 | $Na_{0.7}[Li_{0.2}Mn_{0.8}]O_2$ | 5 | 1.99 | 5.18 | 0.40 |
| Group E | NLM0013 | $Na_{0.81}[Li_{0.24}Mn_{0.76}]O_2$ | 5 | 2.29 | 4.89 | 0.47 |
| | NLM0014 | $Na_{0.83}[Li_{0.24}Mn_{0.76}]O_2$ | 5 | 2.34 | 4.87 | 0.47 |
| | NLM0015 | $Na_{0.85}[Li_{0.24}Mn_{0.76}]O_2$ | 5 | 2.38 | 4.84 | 0.47 |
| | NLM0016 | $Na_{0.87}[Li_{0.24}Mn_{0.76}]O_2$ | 5 | 2.47 | 4.82 | 0.46 |
| | NLM0017 | $Na_{0.89}[Li_{0.24}Mn_{0.76}]O_2$ | 5 | 2.47 | 4.80 | 0.46 |
| Final | NLM0018 | $Na_{0.83}[Li_{0.24}Mn_{0.76}]O_2$ | 30 | 14.04 | 29.22 | 2.82 |

At each composition the obtained powder is analyzed by XRD followed by multiphase Rietveld refinement. Single P2 phase is not obtained, since generally a P2 phase, $Li_2MnO_3$ and $Na_2CO_3$ coexist. Multi phase Rietveld refinement allows to quantify impurity phases and lattice constants. The analysis of impurity phases allows to estimate the region of single phase P2 and allows to estimate the manganese valence state in the P2 phase within a phase mixture. A complex analysis of groups A-D narrows down a region were single phase P2 can be obtained. Group E is chosen to further investigate this region where P2 with relatively high Na:M ratio can be obtained. Table 1.2 shows the actually obtained material composition (taking into account the impurities) and the results of the multi phase Rietveld refinement for group E. Sample NLM0014 has a low content of impurities. So, as a result of analyzing groups A-E a promising composition $Na_{0.83}Li_{0.24}Mn_{0.76}O_2$ is selected and a final sample (in Table 1.1: Final=NLM0018) is prepared at larger scale. The sample size is 30 g. The final sample is prepared using blended powder instead of pellets. After cooking the sample is sieved using a 100 μm mesh. XRD analysis shows that the final sample is single phase P2. The successful preparation shows that doping of Mn by lower valent cation as Mg (or Li) allows to increase the Na:M ratio beyond 0.67. The Example demonstrates a value of Na:M=0.81 (actual composition) within the electrochemical active P2 phase.

TABLE 1.2

Impurity phase analysis of Group E samples

| | ID | $Na_2CO_3$ (wt %) | $Li_2MnO_3$ (wt %) | Real product | y | Li/Na | Mn valence |
|---|---|---|---|---|---|---|---|
| Group E | NLM0013 | 6.08 | 1.28 | $Na_{0.70}[Li_{0.24}Mn_{0.76}]O_2$ | 0.70 | 0.34 | 3.97 |
| | NLM0014 | 1.18 | 1.89 | $Na_{0.81}[Li_{0.24}Mn_{0.76}]O_2$ | 0.81 | 0.30 | 3.84 |
| | NLM0015 | 7.85 | 1.41 | $Na_{0.71}[Li_{0.24}Mn_{0.76}]O_2$ | 0.71 | 0.34 | 3.98 |
| | NLM0016 | 4.22 | 0 | $Na_{0.79}[Li_{0.24}Mn_{0.76}]O_2$ | 0.79 | 0.30 | 3.90 |
| | NLM0017 | 8.36 | 2.00 | $Na_{0.74}[Li_{0.24}Mn_{0.76}]O_2$ | 0.74 | 0.32 | 3.92 |

Figure 3:
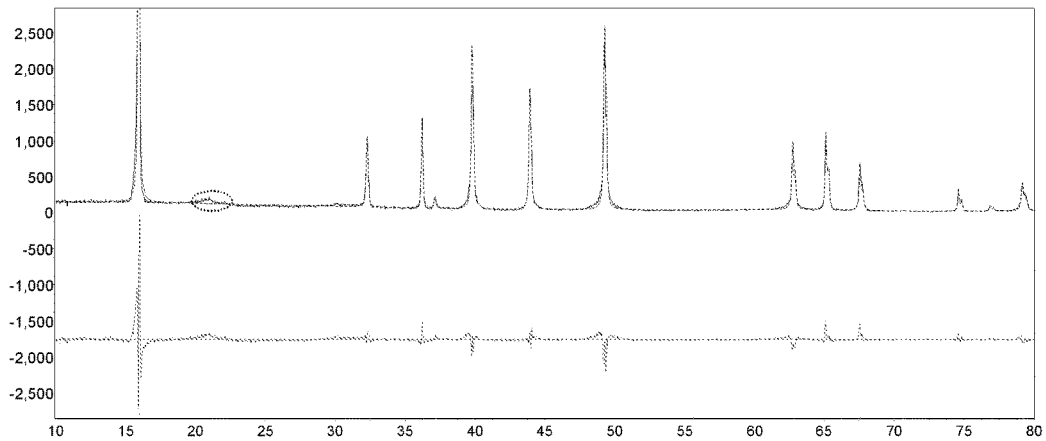
FIG. 3: XRD powder diffraction pattern of $Na_{0.83}[Li_{0.24}Mn_{0.76}]O_2$ (counts vs. degrees)

Table 1.3 lists the results of the Rietveld refinement. FIG. 3 shows the XRD powder diffraction pattern of the final sample NLM0018. The graph shows 30% of the total y scale. The 002 peak at 16 deg has total intensity of 9000. Practically single phase material is obtained. The crystal structure is a layered P2 structure. Interesting is a small hump at 19-21 degree. This hump is possibly related to a poorly developed ⅓×⅓ super structure (honey-comb ordering of Mn and Li in the metal layers). A SEM micrograph shows that the preferred morphology is achieved. The BET surface area is 1.39 m²/g. Particle size analysis (laser diffraction in water) gives a D50 of the particle size distribution to be 7 μm.

TABLE 1.3 results of the Rietveld refinement (assuming single phase P2) for the final 30 g sample NLM0018

Space group: P 6$_3$/m m c
a: 2.8601Å, c: 11.0695Å

| Site | Np | x | y | z | Atom | Occ. | $B_{eq}$ |
|---|---|---|---|---|---|---|---|
| Nae | 2 | 1/3 | 2/3 | 3/4 | Na + 1 | 0.4447 | 4.85 |
| Naf | 2 | 0 | 0 | 1/4 | Na + 1 | 0.305 | 4.14 |
| Mn1 | 2 | 0 | 0 | 0 | Mn + 4 | 0.8622 | 1.89 |
| Mn2 | 2 | 0 | 0 | 0 | Li + 1 | 0.1378 | 18.9 |
| O | 4 | 1/3 | 2/3 | 0.08900 | O − 2 | 1 | 4.20 |

$R_B = 5.19$

Example 3: Manganese Valence State and Composition of P2 Phases

Table 2 shows the results of a phase analysis. The left side of the Table gives the target composition and lists the theoretically expected manganese valence state if only single phase P2 phase would be expected. The right side of the Table shows the composition of the observed P2 phase within a phase mixture. It also gives the corresponding 'real' manganese valence state of the P2 phase. The XRD analysis with multiphase Rietveld refinement gave quantitative results for the concentration of the P2 phase and impurity phases. Typically the phase mixture contained mostly P2 phase and impurity phases of $Li_2MnO_3$ and/or $Na_2CO_3$. The real P2 phase composition is achieved by subtracting the Na, Li and Mn of the impurity phases from the target composition, furthermore assuming a $Na_x[Li_yMn_{1-y}]O_2$ composition. Group A is excluded because it contained high concentrations of impurity phase. Group F is an example of $Na_x[Mg_yM_{1-y}]O_2$.

Table 2 shows that P2 phases with very high Na:M ratio x were not observed. The x in the real P2 phase $Na_x[Li_yMn_{1-y}]O_2$ varies from 0.64 to 0.84. Comparing the theoretically expected manganese valence state of the target composition with the real valence state of the P2 phase, the Table shows that within each group, if the theoretical valence state is high, then the real valence state is smaller. If the theoretical valence state is low then the real valence state is higher. Clearly we observe a preferred manganese valence state near to 4+.

TABLE 2

Calculated Mn valence state assuming single phase P2 with target composition and observed Mn valence state of P2 phase after correcting composition of P2 phase by subtracting the fraction times composition of the observed impurity phases

| | | Calculated(starting) stoichiometry | | |
|---|---|---|---|---|
| | Id | Target compound | Mn valence | Li/Mn |
| Group B | NLM0004 | $Na_{0.9}[Li_{0.33}Mn_{0.67}]O_2$ | 4.13 | 0.49 |
| | NLM0005 | $Na_{0.9}[Li_{0.3}Mn_{0.7}]O_2$ | 4.00 | 0.43 |
| | NLM0006 | $Na_{0.9}[Li_{0.25}Mn_{0.75}]O_2$ | 3.80 | 0.33 |
| Group C | NLM0007 | $Na_{0.8}[Li_{0.275}Mn_{0.725}]O_2$ | 4.03 | 0.38 |
| | NLM0008 | $Na_{0.8}[Li_{0.25}Mn_{0.75}]O_2$ | 3.93 | 0.33 |
| | NLM0009 | $Na_{0.8}[Li_{0.2}Mn_{0.8}]O_2$ | 3.75 | 0.25 |
| Group D | NLM0010 | $Na_{0.7}[Li_{0.25}Mn_{0.75}]O_2$ | 4.07 | 0.33 |
| | NLM0011 | $Na_{0.7}[Li_{0.225}Mn_{0.775}]O_2$ | 3.97 | 0.29 |
| | NLM0012 | $Na_{0.7}[Li_{0.2}Mn_{0.8}]O_2$ | 3.88 | 0.29 |
| | | | | Na/M |
| Group E | NLM0013 | $Na_{0.81}[Li_{0.24}Mn_{0.76}]O_2$ | 3.88 | 0.81 |
| | NLM0014 | $Na_{0.83}[Li_{0.24}Mn_{0.76}]O_2$ | 3.85 | 0.83 |
| | NLM0015 | $Na_{0.85}[Li_{0.24}Mn_{0.76}]O_2$ | 3.83 | 0.85 |
| | NLM0016 | $Na_{0.87}[Li_{0.24}Mn_{0.76}]O_2$ | 3.80 | 0.87 |
| | NLM0017 | $Na_{0.89}[Li_{0.24}Mn_{0.76}]O_2$ | 3.78 | 0.89 |
| Group F | NML0018 | $Na_{0.72}[Mg_{0.28}Mn_{0.72}]O_2$ | 3.77 | / |

| | | Real stoichiometry | | |
|---|---|---|---|---|
| | Id | product | Mn valence | Li/Mn |
| Group B | NLM0004 | $Na_{0.84}[Li_{0.23}Mn_{0.77}]O_2$ | 3.81 | 0.30 |
| | NLM0005 | $Na_{0.80}[Li_{0.22}Mn_{0.78}]O_2$ | 3.83 | 0.28 |
| | NLM0006 | $Na_{0.73}[Li_{0.23}Mn_{0.77}]O_2$ | 3.97 | 0.30 |
| Group C | NLM0007 | $Na_{0.75}[Li_{0.23}Mn_{0.77}]O_2$ | 3.92 | 0.30 |
| | NLM0008 | $Na_{0.73}[Li_{0.23}Mn_{0.77}]O_2$ | 3.96 | 0.30 |
| | NLM0009 | $Na_{0.70}[Li_{0.20}Mn_{0.80}]O_2$ | 3.87 | 0.25 |
| Group D | NLM0010 | $Na_{0.68}[Li_{0.23}Mn_{0.77}]O_2$ | 4.03 | 0.30 |
| | NLM0011 | $Na_{0.64}[Li_{0.22}Mn_{0.78}]O_2$ | 4.05 | 0.28 |
| | NLM0012 | $Na_{0.66}[Li_{0.20}Mn_{0.80}]O_2$ | 3.92 | 0.25 |
| Group E | NLM0013 | $Na_{0.70}[Li_{0.24}Mn_{0.76}]O_2$ | 3.97 | 0.32 |
| | NLM0014 | $Na_{0.81}[Li_{0.24}Mn_{0.76}]O_2$ | 3.84 | 0.32 |
| | NLM0015 | $Na_{0.71}[Li_{0.24}Mn_{0.76}]O_2$ | 3.98 | 0.32 |
| | NLM0016 | $Na_{0.79}[Li_{0.24}Mn_{0.76}]O_2$ | 3.90 | 0.32 |
| | NLM0017 | $Na_{0.74}[Li_{0.24}Mn_{0.76}]O_2$ | 3.92 | 0.32 |
| Group F | NML0018 | $Na_{0.67}[Mg_{0.28}Mn_{0.72}]O_2$ | 3.85 | / |

Example 4: Electrochemical Performance of P2 $Na_x[Li_yMn_{1-y}]O_2$ with High x Sample NLM0018 was tested in sodium coin cells. Table 3 illustrates the slurry making. The slurry was coated on Aluminum foil and dried at 120° C. Coin cells with metal sodium anode were assembled. The electrolyte was 1M $NaClO_4$ dissolved in PC/DMC (1:1).

TABLE 3

| Slurry making conditions | | | |
|---|---|---|---|
| Active material | Super P | PVDF 5% in NMP | Additional NMP |
| 5 g | 0.625 g | 12.5 g | 8-10 drops by pipet |

Active material:Super P:PVdF = 80:10:10

Figure 4:
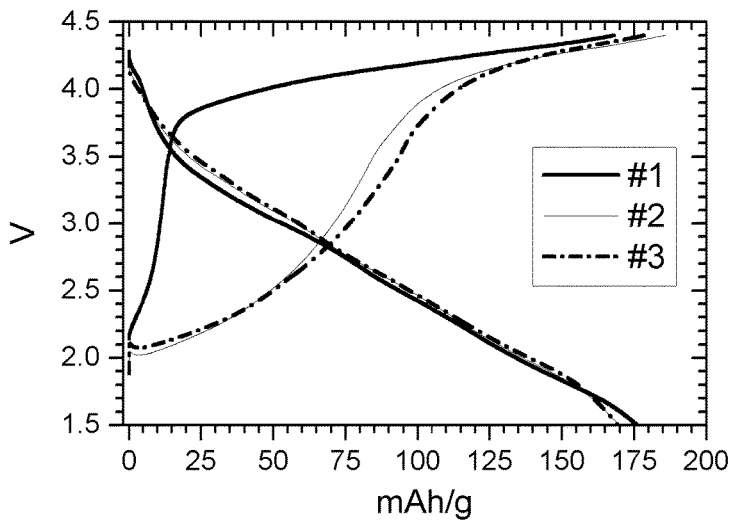
FIG. 4: Coin cell testing $Na_{0.83}[Li_{0.24}Mn_{0.76}]O_2$ in a sodium half cell

FIG. 4 shows the results of electrochemical testing of sample NLM0018 ($Na_{0.83}[Li_{0.24}Mn_{0.76}]O_2$) in a sodium half cell (cycles #1-3). The voltage range 1.5-4.4V, the current is 10 mA/g. We observe the typical voltage profile for cathodes of the present invention: due to the high manganese valence state 3.5V is reached already much before 40% state of charge during first cycle but at much more than 40% state of charge during later cycles. In the voltage range 1.5-4.5V using a current of 10 mA per g of active material a reversible capacity above 170 mAh/g is obtained. The voltage increases fast to 3.8V because the initial manganese valence state is high and the 4+ valent limit is reached fast. (The theoretical capacity for $Na_{0.83}[Li_{0.24}Mn_{0.76}]O_2$ until Mn is tetravalent can be calculated as 41 mAh/g). Further charging possibly causes the extraction of sodium together with oxygen. After 4.4V is reached (170 mAh/g) the crystal structure has changed. So the discharge voltage profile has a much lower average voltage than the 1$^{st}$ charge (#1). During cycle 2 (#2) and 3 (#3) the voltage profile remains constant.

If the sodium stoichiometry x in $Na_x[Li_yMn_{1-y}]O_2$ is less than 1 we expect that less sodium (maximum x mol) can be extracted and more sodium (maximum 1 mol) can be re-inserted resulting in a negative irreversible capacity Qirr={Q(charge)−Q(discharge)}/Q charge. Negative irreversible capacities are not desired. The higher x in $Na_x[Li_yMn_{1-y}]O_2$ the less negative the irreversible capacity will be. FIG. 4 shows that the irreversible capacity is only minus 9%.

Example 5

This Example confirms that Na—Mg—Mn—$O_2$ cathodes with P2 crystal structure show a 1$^{st}$ charge irreversible voltage plateau, have a high reversible capacity, good cycle stability and good power.

Precursors $Na_2CO_3$, $Mn_2O_3$ and $(MgCO_3)Mg(OH)_2*5H_2O$ were mixed using proper molar ratios, fired at 900° C. for 12 h in air, then quenched to obtain $Na_{2/3}MO_2$, with M=$Mg_{0.28}Mn_{0.72}$. XRD diffraction confirmed that basically a single phase structure having a P2 crystal structure is obtained. Coin cells are prepared, with electrodes having a 80:10:10 (active material:acetylene black:PVDF) electrode composition. The anode is Na metal, the electrolyte 1M $NaClO_4$ in PC:DMC:FEC with a 49:49:2 ratio. The electrode contains about 3.2-3.5 mg/cm$^2$ of active material. Electrochemical testing is performed at a current of 10 mA/g, and using a voltage window of 1.5 to 3.6V, respectively 1.5-4.4V.

Figure 5:
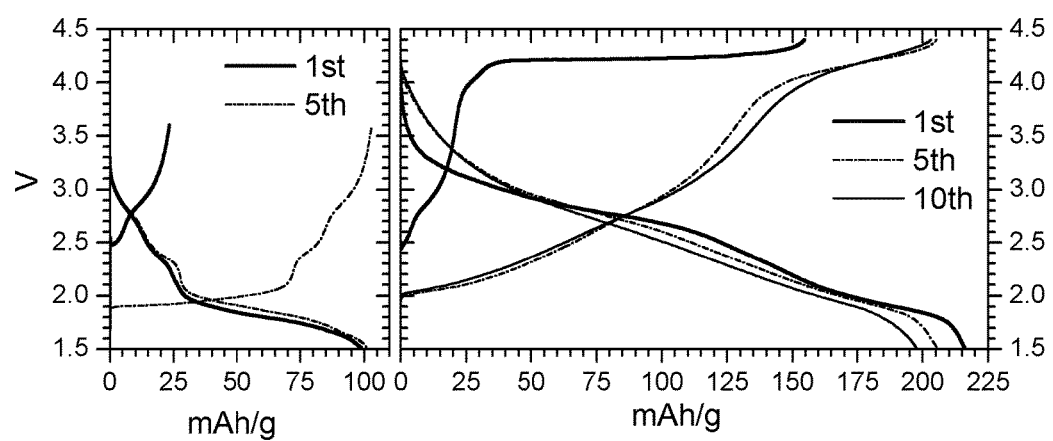
FIG. 5: Coin cell testing of the $Na_{2/3}MO_2$, $M=Mg_{0.28}Mn_{0.72}$ cathode. Left panel: V=1.5-3.6V, right panel V=1.5-4.4V

The results are shown in FIG. 5. In the 1.5-3.6V window only 25 mAh/g are extracted and the reversible capacity is small. When charging to 4.4V 150 mAh/g are extracted and the reversible capacity is >200 mAh/g. At high voltage (>4V) a pronounced irreversible 1$^{st}$ charge plateau is observed. After 10 cycles still about 200 mAh/g capacity remain, indicating a good cycle stability. The rate performance is also tested. At 1C rate (200 mA/g), V=4.4-1.5V a capacity of 141 mAh/g corresponding to about 70% is achieved.

The invention claimed is:

1. A sodium transition metal cathode material for a rechargeable sodium battery, having a P2 layered bronze crystal structure and having a composition $Na_xMO_2$, M comprising at least 55 mol % manganese, wherein the manganese valence state is at least 3.75, wherein $2/3<x<0.95$, wherein $M=Mn_{1-y-z}Li_yA_z$, with $0\leq z<0.2$ and $0<y<0.33$, wherein A is Mg or A is Ni and Mg.

2. The sodium cathode material of claim 1, wherein A is Mg.

3. The sodium cathode material of claim 1, wherein $0<z$.

4. The sodium cathode material of claim 1, wherein $0.70<x<0.95$.

5. The sodium cathode material of claim 1, having a specific surface area (BET) between 0.2 and 5 $m^2/g$ and a particle size distribution with 1 μm$<D50<30$ μm.

6. A cathode for a rechargeable sodium battery, wherein the cathode comprises the sodium cathode material according to claim 1.

7. The sodium cathode material of claim 1, wherein A is Mg and wherein $0<z$.

8. A sodium transition metal cathode material for a rechargeable sodium battery, having a P2 layered bronze crystal structure and having a composition $Na_xMO_2$, M comprising at least 55 mol % manganese, wherein the manganese valence state is at least 3.75, wherein the material has a composition $Na_xMO_2$ with $2/3<x<0.95$, wherein $M=Li_{a'}Mn_{1-a'-b'-c'}Mg_{b'}A'_{c'}$ with $0\leq a'<0.2$, $b'>0$, $c'<0.2$ and $0.2<a'+b'<0.46$, and wherein A' is selected from the group consisting of one or more elements of Ti, Cr, Fe, Ni and Co.

9. The sodium cathode material of claim 8, wherein $0.70\leq x\leq 0.85$ and $0.23\leq b'\leq 0.28$.

10. The sodium cathode material of claim 8, wherein $c'>0$.

11. The sodium cathode material of claim 8, having a specific surface area (BET) between 0.2 and 5 $m^2/g$ and a particle size distribution with 1 μm$<D50<30$ μm.

12. A cathode for a rechargeable sodium battery, wherein the cathode comprises the sodium cathode material according to claim 8.

13. A sodium transition metal cathode material for a rechargeable sodium battery, having a P2 layered bronze crystal structure and having a composition $Na_xMO_2$, wherein M comprises at least 55 mol % manganese, wherein the manganese valence state is at least 3.75, wherein $M=Mg_{y''}Mm_{1-y''}$, wherein $0.67<x<0.95$ and $[(x-0.25)/1.75]\leq y''\leq[(x+0.05)/2.05]$.

14. The sodium cathode material according to claim 13 having a particle size distribution with 3 μm$<D50<15$ μm.

15. The sodium cathode material of claim 14, having a BET specific surface area between 0.2 and 5 $m^2/g$.

16. A cathode for a rechargeable sodium battery, wherein the cathode comprises the sodium cathode material according to claim 13.

17. The sodium cathode material of claim 8, wherein $c'=0$.

18. The sodium cathode material of claim 9, wherein $c'=0$.

* * * * *